Dec. 7, 1937.  E. B. LEAR  2,101,144
AIR OR WATER TUBE CONNECTION FOR ROCK DRILLS
Filed Jan. 7, 1936
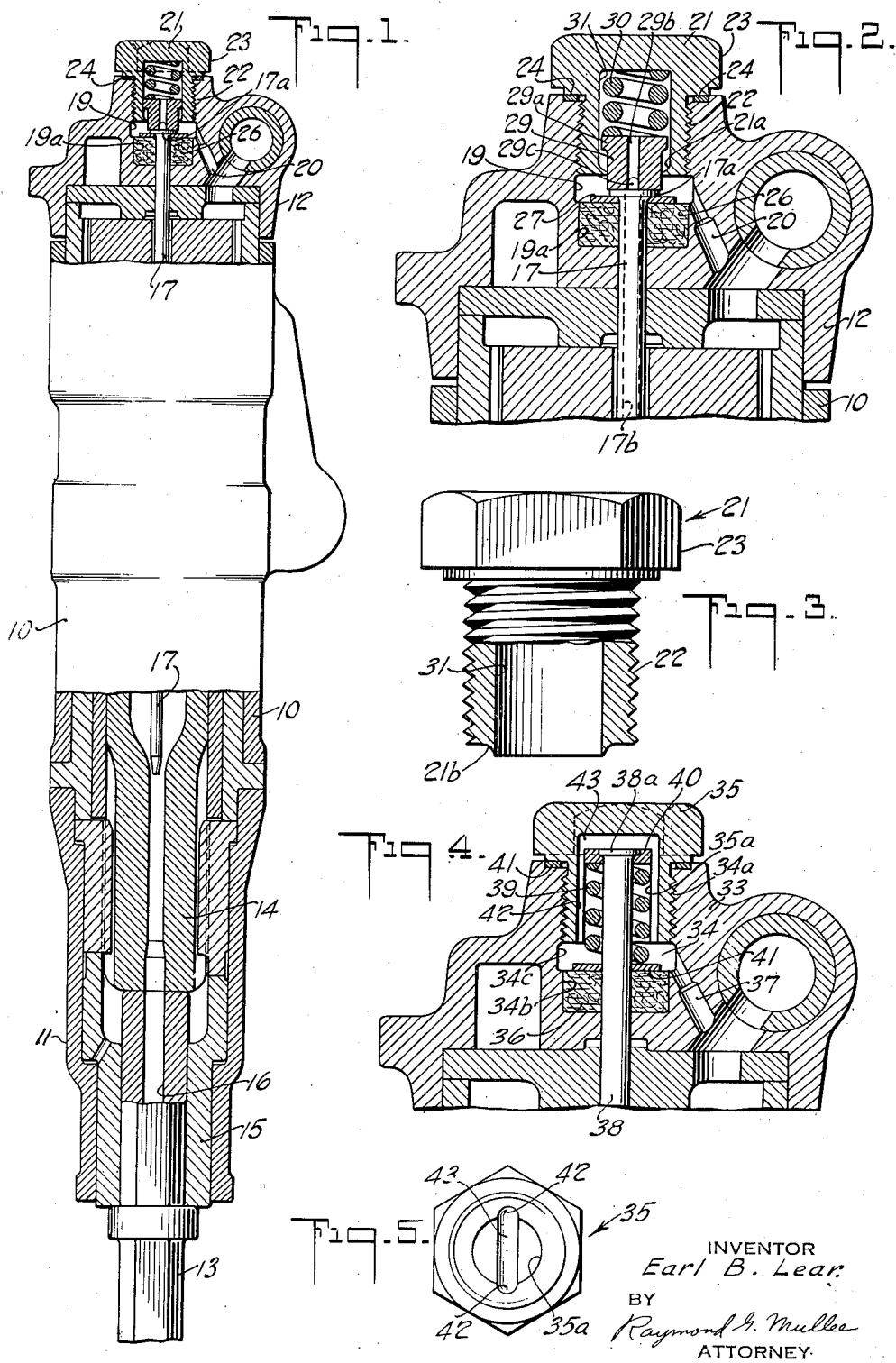
INVENTOR
*Earl B. Lear.*
BY
*Raymond G. Mullee*
ATTORNEY Patented Dec. 7, 1937

2,101,144

UNITED STATES PATENT OFFICE 2,101,144

AIR OR WATER TUBE CONNECTION FOR ROCK DRILLS

Earl B. Lear, Detroit, Mich., assignor to Chicago Pneumatic Tool Company, New York, N. Y., a corporation of New Jersey Application January 7, 1936, Serial No. 57,897

2 Claims. (Cl. 121—10)

This invention relates to rock drills and more particularly to a connection in the back head for a tube adapted to deliver cleansing fluid, such as water or compressed air to a hollow drill steel for removing the cuttings from the hole.

An object of the invention is the provision of a connection of this type which will automatically maintain a seal between the packing and the tube as the packing wears. A feature of the invention is an improved arrangement including a spring, interposed between the packing and a threaded plug, which permits the threaded connection to be as tight as necessary without exerting excessive pressure on the packing.

Another object is to provide an air or water tube connection which is readily removable whenever it is desired to replace the tube. In one form of the invention, the connection comprises a screw threaded plug in the back head which forms a housing for a spring and a bushing, characterized in that the plug, spring and bushing are inseparable from each other even when the plug is removed from a back head, whereby to minimize loss of time in replacing the parts in operative position.

Further objects of the invention include the provision of an air or water tube connection which is simple in construction and inexpensive to manufacture.

Other objects and features will appear more clearly from the following description taken in connection with the accompanying drawing and appended claims.

In said drawing:

Fig. 1 is a view partly in section and partly in elevation of a rock drill equipped with an air tube mounted in accordance with one form of the invention;

Fig. 2 is a fragmentary sectional view similar to Fig. 1 but on a larger scale;

Fig. 3 is a sectional view of the screw threaded plug shown in Figs. 1 and 2 but at an intermediate stage of manufacture;

Fig. 4 is a fragmentary cross-section of a modified embodiment of the invention; and Fig. 5 is an elevational view of the plug shown in Fig. 4, looking upwardly or rearwardly.

The embodiment of the invention illustrated in Figs. 1, 2 and 3 comprises a cylinder 10, carrying at its forward end a front head 11 and at its rear end a back head 12. A hollow drill steel 13 projects into the front head to receive impact blows from a hammer piston 14. The steel is supported by a chuck bushing 15 carried by the front head. The drill steel 13 has a bore 16 therethrough for conveying cleansing fluid to the hole being drilled.

The flushing fluid is supplied to the drill steel bore 16 by means of a tube 17 which extends longitudinally through the cylinder 10 and piston 14 and projects into the back head 12.

The back head 12 has a recess 19 which may be supplied with live air by a passage 20. A plug 21 has a threaded connection 22 with the rear end of the recess and has a head 23 tightly engaging a washer 24 on the rear end of the back head. The rear extremity of the tube 17 has an annular flange 17a disposed within the recess 19.

To prevent leakage of cleansing fluid from the recess 19 around the outer surface of the tube into the cylinder 10, a packing member 26, made of rubber or other suitable material, is provided at the bottom of the recess. The packing member is shaped to fit the outside of the tube 17 and the cylindrical portion 19a of the recess respectively. A brass washer 27, bonded to the rubber member 26 provides a seat for flange 17a and prevents damage to the packing as the tube is turned during the assembly of the plug.

This invention includes novel means for compressing the packing material 26 in an axial direction to cause it to grip the tube 17 with the required degree of pressure. The tensioning means comprises a plunger 29 yieldingly held against the rear face of the flange 17a by a spring 30. The spring and a portion of the plunger are enclosed in a recess 31 in the plug 21 and are held against separation from the plug by flanges 21a and 29a formed on the plug and plunger respectively. The tube 17 has a central bore 17b which communicates with an axial bore 29b and radial grooves 29c in the plunger.

In operation, cleansing fluid, such as live air, is delivered through passage 20, recess 19, plunger grooves 29c, and bore 17b of tube 17 which discharges the fluid through the bore 16 in the drill steel 13 to flush the cuttings from the hole being drilled. At the same time fluid is admitted to the recess 31 in plug 21 by means of the axial port 29b in the plunger to assist in maintaining the pressure of the plunger 29 against packing 26.

In assembling the elements of the embodiment of the invention shown in Figs. 1, 2 and 3, the plug 21, plunger 29 and spring 30 are handled as a unit. After the packing 26 and tube 17 have been inserted, the plug is screwed tightly against the washer 24, the resiliency of the spring permitting a tight connection without causing too much pressure against the packing 26. The inseparable connection between the plug, plunger and spring enables the operator to assemble and replace parts in a minimum of time.

Before the plunger and spring are connected to the plug 21, the latter is constructed in the shape shown in Fig. 3 with an annular projection 21b at the open end of the screw threaded portion. The spring and plunger are inserted in the plug and the projection is rolled, or otherwise deformed, to the shape shown in Fig. 2, in which the retaining flange 21a extends inwardly.

In the modification illustrated in Figs. 4 and 5, the cylinder and backhead are arranged and constructed as in the Fig. 1 embodiment. The backhead 33 has a recess 34 comprising a threaded portion 34a which receives a plug 35, a bottom portion 34b which receives packing material 36, and an intermediate portion 34c supplied with cleansing fluid, such as compressed air, through a port 37. A tube 38 extends through the cylinder (not shown) and backhead 33 and terminates at its rear end in a flange 38a which abuts against the rear wall of a recess 35a in the plug. A compression spring 39 is interposed between a pair of washers 40 and 41, one of which is seated on the flange 38a and the other of which is bonded to the rubber packing 36. The spring maintains pressure against the packing to provide a fluid seal around the circumference of the tube 38. The head of the plug 35 seats against a washer 41 on the back head. Communication between the intermediate portion 34c of the recess and the interior of the tube is provided by longitudinal grooves 42 and a radial groove 43 formed on the inside of the plug 35. Live air or other cleansing fluid is conducted from supply port 37 to recess 34c, through grooves 42 and 43, tube 38 and the hollow drill steel (not shown) to blow the dust from the hole being drilled.

When plug 35 is removed, the spring automatically forces the tube rearwardly and within easy reach for removing.

In both forms of the invention a spring compresses and seals the packing member and compensates for irregularities in the distance between the packing and the seat for the plug, which irregularities may result from tolerances in manufacture or from wear of the packing.

While the invention has been illustrated and described with particular reference to an air tube, it is equally applicable to a water tube. Furthermore, many modifications and adaptations may be made within the spirit of the invention and the scope of the appended claims.

What is claimed is:

1. In a rock drill, a cylinder, a back head therefor having a rearwardly facing recess, a tube coaxial with the cylinder and adapted to conduct cleansing fluid therethrough, said tube projecting into the recess and having a flange formed on its rear extremity, a packing member seated in the closed end of the recess, said flange being seated on said packing member, means for supplying cleansing fluid to the recess, a plug threadably connected to the back head to close the rear end of the recess, said plug having an opening therein which terminates short of the rear end of the plug and which is in communication with the fluid supplying means, a plunger abutting said flange and projecting into the opening in the plug, and a compression spring in the plug having its ends in engagement with the plug and plunger respectively, whereby to urge the plunger, plug and flange forwardly to compress the packing, said plunger and plug being formed with cooperating stop means to prevent removal of the plunger and spring from the plug when the latter is removed from the back head.

2. In a rock drill, a cylinder, a back head therefore having a rearwardly facing recess, a tube coaxial with the cylinder and adapted to conduct cleansing fluid therethrough, said tube projecting into the recess and having a flange formed on its rear extremity, a packing member seated in the closed end of the recess, said flange being seated on said packing member, means for supplying cleaning fluid to the recess, a plug threadably connected to the back head to close the rear end of the recess, said plug having an opening therein which terminates short of the rear end of the plug and which is in communication with the fluid supplying means, a plunger abutting said flange and projecting into the opening in the plug, and a compression spring in the plug having its ends in engagement with the plug and plunger respectively, whereby to urge the plunger, plug and flange forwardly to compress the packing, the front end of the plug having an inwardly directed flange and the plunger having a peripheral flange inside the plug, the two last-mentioned flanges being axially spaced when the plug is in operative position and being adapted to engage each other to prevent separation of the plunger from the plug when the latter is removed from the back head.

EARL B. LEAR.